United States Patent [19]
Gardon et al.

[11] 3,874,907

[45] Apr. 1, 1975

[54] MICROCAPSULES FOR USE IN ARTIFICIAL KIDNEY MACHINES

[75] Inventors: Roger Gardon; Jean-Pierre Quentin, both of Lyon, France

[73] Assignee: Rhone Poulenc S.A., Paris, France

[22] Filed: Feb. 13, 1973

[21] Appl. No.: 332,218

[30] Foreign Application Priority Data

Feb. 16, 1972 France .............................. 72.05187

[52] U.S. Cl. ............... 117/100 C, 117/138.8 UA, 117/161 UN, 210/321, 260/2.1 R
[51] Int. Cl. ............................................. B32b 27/08
[58] Field of Search ............. 210/22, 321, DIG. 23; 117/161 UN, 100 C, 138.8 UA; 260/895, 2.2 R, 2.1 R; 252/316

[56] References Cited
UNITED STATES PATENTS

| | | | |
|---|---|---|---|
| 2,654,671 | 10/1953 | Azorlosa ................... | 117/161 UN X |
| 2,891,014 | 6/1959 | Tsunoda et al. ................. | 260/2.2 R |
| 2,962,454 | 11/1960 | McRae et al. ............. | 117/161 UN X |
| 3,463,728 | 8/1969 | Kolobow et al. ..................... | 210/22 |
| 3,522,346 | 7/1970 | Chang .............................. | 210/22 X |
| 3,617,545 | 11/1971 | Dubois et al. .......................... | 210/22 |
| 3,669,878 | 6/1972 | Marantz et al. ........................ | 210/22 |
| 3,697,418 | 10/1972 | Johnson ................................ | 210/22 |

*Primary Examiner*—William D. Martin
*Assistant Examiner*—Dennis C. Konopacki
*Attorney, Agent, or Firm*—Stevens, Davis, Miller & Mosher

[57] ABSTRACT

Microcapsules having particular utility for separating urea from saline solutions in artificial dialysis or ultrafiltration kidney machines are provided being substantially spherical and of diameter between about $10\mu$ and 5 mm and consisting essentially of a crosslinked polymer containing sulphonic acid groups and possessing a theoretical exchange capacity greater than about 0.5 meg/g of dry polymer having a skin coating of a polymer containing quaternary ammonium groups bonded by at least one covalent bond to the chain of said polymer, the polymer possessing a permeation selectivity greater than about 65 percent and a water absorption of between about 2 and 50 percent, the thickness of the skin being about 0.1 to 20 percent of the radius of the microcapsule.

18 Claims, 1 Drawing Figure

PATENTED APR 1 1975
3,874,907
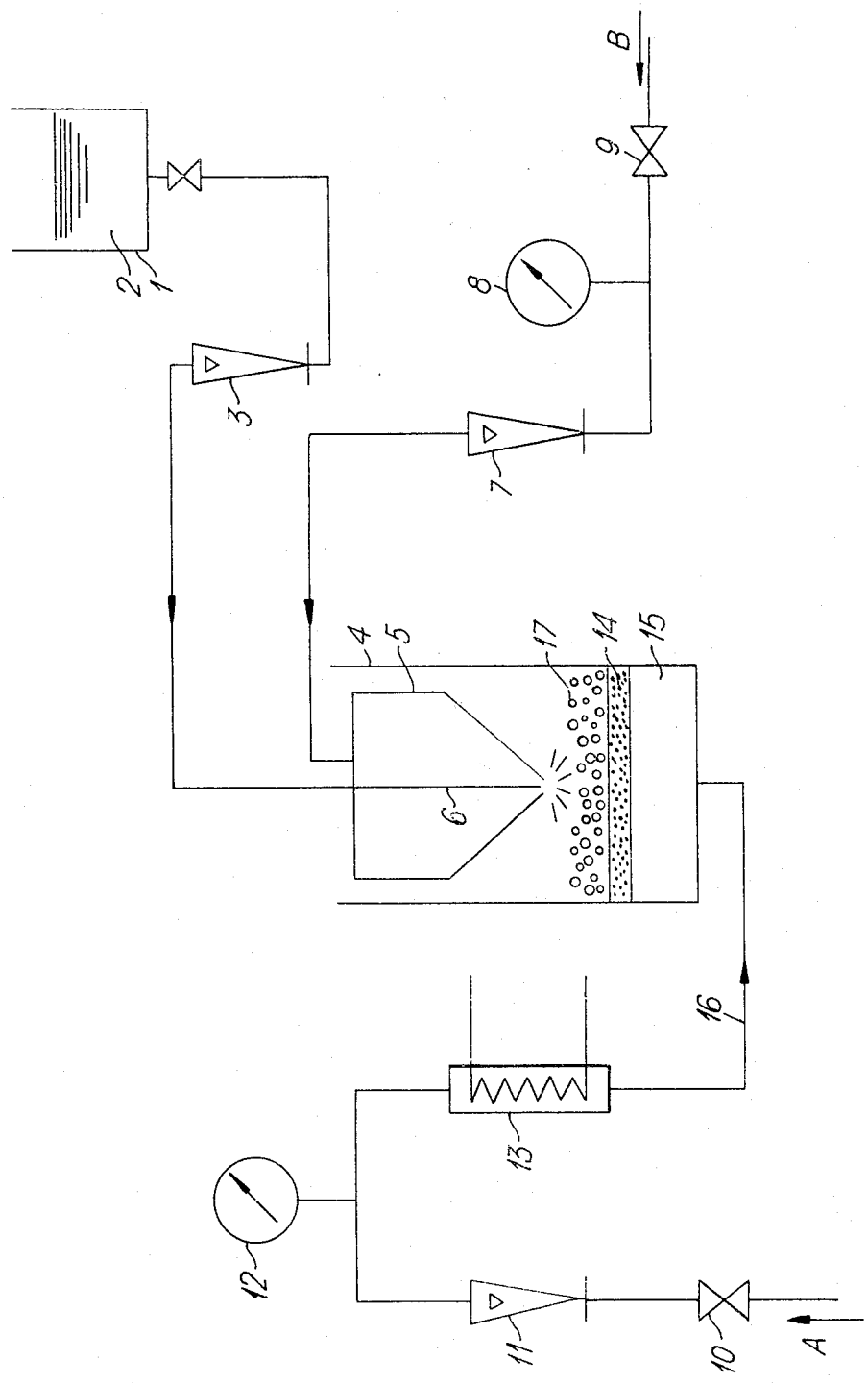

MICROCAPSULES FOR USE IN ARTIFICIAL KIDNEY MACHINES

BACKGROUND OF THE INVENTION

The present invention relates to microcapsules which can be used, in particular, in an artificial kidney machine.

The artificial isolation of urea from blood — a function normally carried out by the kidney — has given rise over recent years to various investigations. The principle of the artificial kidney consists of isolating urea from blood directly by dialysis or after ultrafiltration, using appropriate membranes. The use of these techniques does, however, pose problems. Thus in the case of the dialysis kidney machine, the main problems posed are either that of regenerating the dialysis bath when the latter is recycled into the dialyser, or that of using complex devices (a monitor and metering pumps) to supply the dialyser continuously with a dialysis bath of absolutely constant composition. In the case of the ultrafiltration kidney machine, it is also necessary to separate the urea from the other components in the ultrafiltrate such as salts which have passed through the membrane at the same time as the urea but which must be reincorporated into the blood in order to maintain the electrolyte composition thereof substantially constant.

Taking account of the fact that only the undesirable products, such as urea, are to be removed, the use of microcapsules containing a substance capable of binding urea has been proposed [see Chang, Trans. Am. Soc., Artif. Intern. Organs. vol. 12–13 (1966)] following the latter's preliminary work on the microencapsulation of enzymes [see Science, vol. 146, p. 524–525 (1964)]. Sparks et al have, in particular, described microcapsules, of diameter between 200 and 800μ, which contain urease and a resin capable of binding the ammonia resulting from the hydrolysis of urea by urease, the skin of these microcapsules consisting of a membrane which is not permeable to the cations $Na^+$ and $K^+$, for example a membrane consisting of a cationic polymer (see Sparks, Annual Progress Report "Removal of waste metabolites from dialysing fluid by microencapsulated reactants", PB 191,933, submitted to the National Institute of Arthritis and Metabolic Diseases).

The decomposition of urea into ammonia and carbon dioxide does, in fact, pose the very delicate problem of the practically quantitative removal of ammonia, given that the latter is toxic in the circulatory system when its concentration exceeds $5 \times 10^{-5}$ N (see Sparks, op. cit., p. 17). Sparks has indeed suggested that microcapsules be used which contain only a specified ion exchange resin of the sulphonated polystyrene type in the acid form and that this resin be isolated from the ionic components of the dialysis bath by means of a "membrane" which is permeable to non-ionic species such as urea but impermeable to ionic species (see Sparks, op. cit., p. 130). Sparks has referred to the work of Gottlieb [J. Phys. Chem., 61, 154 (1957)] who has prepared nitrocellulose membranes to which ionic properties have been imparted by the absorption of quaternised 2-polyvinyl-N-methylpyridinium bromide. It is, however, extremely difficult to manufacture such microcapsules with a heterogeneous skin in a reproducible way. In particular, it is difficult to attach the ionic sites to the skin in a uniform manner, yet this is essential for this particular use. This difficulty of manufacturing microcapsules in general and those with an ionic skin in particular, in a reproducible manner, mentioned by Sparks (op. cit., p. 133 and 127) seem hitherto to have prevented the method suggested by Sparks from being a practical reality.

SUMMARY OF THE INVENTION

Microcapsules have now been found, according to the present invention, which consist of particles of a sulphonic acid polymer, coated with a skin of a polymer possessing quaternary ammonium groups, which microcapsules can be manufactured iin a reproducible way without difficulty and which possess ionic sites uniformly distributed over the whole of their surface. Such microcapsules are free from urease or any other substance which causes urea to decompose into ammonia and $CO_2$ in the presence of water.

According to the present invention, there are provided substantially spherical microcapsules of diameter from $10\mu$ to 5 mm., consisting essentially of a core made of a crosslinked polymer containing sulphonic acid groups and possessing a theoretical exchange capacity greater than 0.5 meq/g. of dry polymer, having a skin coating of a polymer containing quaternary ammonium groups bonded by at least one covalent bond to the chain of said polymer, the polymer possessing a permeation selectivity greater than 65 percent and water absorption of between 2 and 50 percent, the thickness of the skin being 0.1 to 20 percent of the radius of the microcapsule.

In the following description, the polymer containing $-SO_3H$ groups is referred to as the "sulphonic acid resin" and the polymer containing

groups is referred to as the "cationic polymer."

The "theoretical exchange capacity" is a conventional expression used in relation to ion exchange resins. In the particular case of sulphonic acid resins, it defines (as used herein) the amount of acid groups in the resin, in milliequivalents of ion exchanged per gram of resin.

The "permeation selectivity" is the ability of a membrane to allow only a particular category of ions possessing a charge of the same sign to pass, and to exclude ions with a charge of the opposite sign. It is determined as used herein according to the method described in French Pat. No. 1,584,187.

By "water absorption", as used herein, is meant the ratio:

$$\frac{\text{Weight of polymer after a dwell time of 20 hours in water at 25°C.} - \text{Weight of dry polymer}}{\text{Weight of dry polymer}}$$

By "dry polymer" is meant the polymer which has been dried in vacuo (100 mm/Hg.) for 20 hours in the presence of $P_2O_5$ at ambient temperature (20°–25°C.).

The sulphonic acid resins used in the microcapsules of the present invention can generally be defined as comprising:

a. 50 to 90 percent by weight of units of the formula:

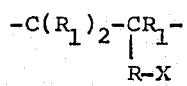
(I)

b. 2 to 50 percent by weight of units of the formula:

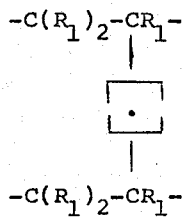
(II)

and c. 0 to 30 percent by weight of units of the formula:

$$-CR_2R_3-C(R_3)_2-$$
(III)

in which:
each of the $R_1$ radicals which may be identical or different, represents a hydrogen atom or an alkyl radical containing 1 to 4 carbon atoms; the symbol R represents:

either a valency bond;

or a linear or branched, alkylene or alkenylene radical containing at most 6 carbon atoms, a phenylene radical or a divalent radical formed by linding alkylene radicals by —O— or —S— atoms or by linking at least one alkylene radical and at least one phenylene radical, the linking being carried out either directly or via —O— or —S— atoms, the total number of carbon atoms of the alkylene groups of these chains being at most equal to 18 and the number of phenylene radicals being at most equal to 3, it being possible for all these radicals and chains to be substituted by one or more halogen atoms or OH groups, preferably by at most 6 halogen atoms and at most 6 OH groups;

or a —O—R'— or —S—R'— group, R' representing a divalent radical as defined above for R;

each of the $R_2$ radicals which may be identical or different, represents a hydrogen atom, a halogen atom or an alkyl radical containing 1 to 4 carbon atoms;

each of the $R_3$ radicals, which may be identical or different, being as defined under $R_2$ or represents a group chosen from amongst the radicals of the formulae:

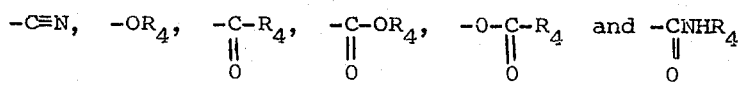

in which $R_4$ represents a hydrogen atom or a linear or branched alkyl radical containing up to 30 carbon atoms, a cycloalkyl radical containing 5 or 6 carbon atoms in the ring or an aryl, alkoxyaryl or aralkoxy radical, the aryl portion of which is preferably phenyl and the alkoxy portion of which is preferably alkoxy of at most 6 carbon atoms;

the symbol ⁻·⁻ represents a divalent atom or group such as, for example, —O—, —S—, —NH—, —$SO_2$— or a divalent organic radical which may optionally carry a —$SO_3H$ substituent in the case of all or part of the units of formula (II), this radical being preferably an alklene or alkenylene radical with at most 6 carbon atoms, a radical derived from the latter by interposing an atom or group —O—, —S—, —NH—, —$SO_2$— or —$C_6H_4$—, or a simple phenylene radical, it being possible for these preferential radicals optionally to be substituted by —$SO_3H$; and the symbol X represents the group —$SO_3H$ in at least a part of the units of formula (I) and a hydrogen atom in the other units of formula (I) (if any).

The number of units of formula (I), or (I) and (II), which contain sulphonic acid groups is such that the resin possesses the theoretical exchange capacity indicated above. Preferably this is greater than 1 geq/g.

The sulphonic acid resins can be obtained by polymerisation of monomers, at least a part of which contains —$SO_3H$ substituents.

The —$SO_3H$ groups are generally provided in this case by monomers of the formula:

$$\begin{array}{c} C(R_1)_2 = CR_1 \\ | \\ R-SO_3H \end{array}$$
(IV)

in which the symbols are as defined above.

Examples of such monomers include vinylsulphonic acid, 1-propene-1-sulphonic acid, allylsulphonic acid, methallylsulphonic acid, allyloxyethylsulphonic acid; 1-butene, 2-butene and 3-butene-1-sulphonic acids; hexenesulphonic acids, especially 1-hexene-1-sulphonic acid; methylbutenesulphonic acids, methallyloxyethylsulphonic acid, 3-allyloxy-2-propanol-1-sulphonic acid, allylthioethylsulphonic acid; 3-allylthio-2-propanol-1-sulphonic acid; vinylbenzenesulphonic acids, especially 3-vinyl-1-benzenesulphonic acid; vinyloxybenzenesulphonic acids, especially 2-vinyloxy- and 4-vinyloxy-1-benzenesulphonic acids; isopropenylsulphonic acids, especially 2-isopropenyl- and 4-isopropenyl-1-sulphonic acids; bromovinylbenzenesulphonic acids, especially 2-bromo- and 4-bromo-3-vinyl-1-benzenesulphonic acids; α-methylstyrenesulphonic acids, α-ethylstyrenesulphonic acids, isopropenylcumenesulphonic acids; mono-, di- and trihydroxyvinylbenzenesulphonic acids; 2,5-dichloro-1-vinylbenzenesulphonic acids, isopropenylnaphthalenesulphonic acids, vinyldichloronaphthalenesulphonic acids; o- and p-allylbenzenesulphonic acids, o- and p-methallylbenzenesulphonic acids; 4-(o- and p-isopropenylphenyl)-1-n-butanesulphonic acids; vinylchlorophenylethanesulphonic acids; o and p-allyloxybenzenesulphonic acids; o and p-methallyloxybenzenesulphonic acids; vinylhydroxyphenylmethanesulphonic acid; vinyltrihydroxyphenylethanesulphonic acids; and 2-isopropyl-1-ethylenesulphonic acid.

The units of formula (II) can, in the present case, originate from monomers of the formula:

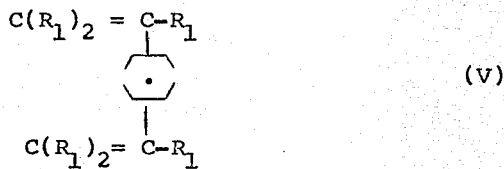
(V)

in which the symbols $R_1$ are defined as above and $\overline{\phantom{z}}$ represents one of the non-sulphonated radicals mentioned above.

As examples of monomers of formula (V), there may be mentioned 1,4-pentadiene, 1,5-hexadiene, vinyl ether, allyl ether, vinyl sulphide, allyl sulphide, diallylamine, diallylsulphone, divinylbenzene and allyl phthalate.

The units of formula (III) are provided by monomers of the formula:

$$CR_2R_3 = C(R_3)_2 \qquad (VI)$$

in which the symbols are defined as above.

By way of illustration of monomers of formula (VI), which can be copolymerised with the monomers defined above, there may be mentioned ethylene, styrene, vinyl bromide, vinyl chloride, vinylidene chloride, acrylonitrile, vinylidene cyanide, methacrylonitrile, allyl alcohol, vinyl and allyl ethers such as vinyl methyl ether, vinyl ethyl ehter, vinyl propyl ether, vinyl cyclohexyl ether, vinyl benzyl ether, allyl methyl ether, allyl ethyl ether, allyl propyl ether, allyl cyclohexyl ether and allyl benzyl ether, vinyl ketones such as methyl vinyl ketone or ethyl vinyl ketone, unsaturated carboxylic monoacids such as acrylic acid, methacrylic acid, crotonic acid and itaconic acid and their alkyl or aryl esters, and particularly methyl, ethyl, butyl and benzyl esters, cyano-(meth)-acrylic esters such as ethyl $\alpha$-cyanoacrylate, vinyl alcohol, vinyl esters of linear aliphatic monocarboxylic acids such as vinyl acetate, propionate, laurate and stearate or vinyl esters of branched aliphatic monocarboxylic acids such as the vinyl esters of acids in which the carboxyl group is situated in the $\alpha$-position to a tertiary or quaternary carbon atom; vinyl esters of aromatic acids such as vinyl benzoate, unsaturated polycarboxylic acids such as maleic acid or its anhydride, fumaric acid, citraconic acid, mesaconic acid and aconitic acid, as well as their mono-, di-, or, where appropriate, trialkyl esters and, particularly, ethyl, propyl, butyl, hexyl, 2-ethyl-hexyl, octyl, $\beta$-hydroxyethyl, cycloalkyl or aryl esters, amides of unsaturated acids such as crotonamide, acrylamide and methacrylamide and the products of reaction of the abovementioned acids with a primary monoamine such as methylaminee, ethylamine, propylamine, cyclohexylamine and aniline.

The sulphonic acid resins used in the present invention can also be prepared by sulphonation of non-sulphonated polymers containing units of formula (I), (II) and optionally (III), in the proportions indicated above. These sulphonation techniques are well known and, on this subject, reference can, for example, be made to "Sulphonation and Related Reactions", Everet E. Gilbert, 1965, Interscience Publishers.

The cationic polymer forming the skin of the microcapsules according to this invention is characterised in that the quaternary ammonium groups are bonded by at least one covalent bond to the polymer chain, by its permeation selectivity and by its water absorption, the quaternary ammonium group being either part of the polymer chain or being a substituent of the chain.

The permeation selectivity is preferably greater than 70 percent and the water absorption is preferably between 5 and 25 percent.

Since the presence of quaternary ammonium groups imparts some hydrophilic character to the polymer, it is possible, in order to remain within the specified water absorption limits, either to make use of crosslinked polymers, or to make use of polymers the chain of which possesses hydrophobic character. Furthermore, the quaternary ammonium groups can be obtained either by quaternisation of tertiary nitrogen atoms which from part of, or are bonded directly to, the main chain of a polymer ($\alpha$), or by reaction of a tertiary amine with a polymer ($\beta$) carrying substituents which are capable of quaternising the amine and capable of ensuring that it is bonded to the polymer. It is apparent from what has been said above that the quaternisation of the tertiary nitrogen atom of a polymer $\alpha$ can, when a polyquaternising agent is used, simultaneously bring about the crosslinking of the polymer; however, it should be understood that the polymer can be crosslinked by methods other than a quaternisation crosslinking as indicated below. It will also be apparent from what has been said above that the quaternisation of a polymer $\beta$ by a polyamine possessing tertiary amine groups can also bring about crosslinking.

More precisely, as polymers of group 60, there may be used polymers comprising a plurality of units of the formula:

$$-C(R_1)_2 - \underset{R_5}{C(R_1)} - \qquad (VII)$$

, optionally combined with units of the furnula (III), $R_1$ being defined as above and $R_5$ representing;
a. a group of the formula:

$$-N(R_6)_2, \quad -\overset{O}{\underset{\|}{C}}O(CH_2)_nN(R_6)_2 \quad \text{or} \quad -R_7N(R_6)_2$$

$n$ being an integer which can generally assume a value from 1 to 4, the symbols $R_6$, which may be identical or different, representing alkyl radicals with 1 to 6 carbon atoms and $-R_7-$ representing a linear or branched alkylene radical with up to 12 carbon atoms or a cycloalkylene radical with 5 or 6 carbon atoms in the ring, or a phenylene radical, or (b) radicals consisting of a heterocyclic structure with 5 or 6 ring members, containing one or two nitrogen atoms and possessing no hetero-atom other than the nitrogen atom(s), optionally fused to one or two benzene rings, the atom, or at least one of the nitrogen atoms, of the heterocyclic structure being bonded by its three valencies to neighbouring carbon atoms in the heterocyclic structure or being bonded by two valencies to the said carbon atoms and by the third to a group $-R_6$, it being possible for the proportion by weight of units of formula (III) to be from 0 to 90 percent, the most desirable proportions being 15 to 40 percent of units of formula (VII) and 60 to 85 percent of units of formula (III).

By way of illustration of monomers which, on polymerisation, give rise to units of formula (VII), there may be mentioned vinyldimethylamine, dimethylaminoethyl acrylate or methacrylate, allyldimethylamine, 1-dimethylamino-1-propene, 2-dimethylamino-1-propene, 1-dimethylamino-2-butene, 4- dimethylamino-1-butene, 3-dimethylamino-1-butene, 3-dimethylamino-2-methyl-1-propene, methylethylallylamine, vinyldiethylamine, 5-dimethylamino-1-pentene, 4-dimethylamino-3-methyl-1-butene, methylpropylallylamine, allyldiethylamine, 6-dimethylamino-1-hexene, ethylvinylbutylamine, dialkylaminostyrenes, particularly dimethylaminostyrene and diethylaminostyrene, vinylpyridines, particularly N-vinylpyridine, 2-vinylpyridine, 3-vinylpyridine, 4-vinylpyridine and their substitution derivatives such as 5-methyl-2-vinylpyridine, 5-ethyl-2-vinylpyridine, 6-methyl-2-vinylpyridine, 4,6-dimethyl-2-vinylpyridine and 6-methyl-3-vinylpyridine, N-vinylcarbazole, vinylpyridimidine and 2-vinylbenzimidazole.

The polymers described above can be crosslinked either by quaternisation of the nitrogen atoms by means of polyquaternising agents, or at the level of the units of the formula (III) when the latter possess reactive groups such as, for example, hydroxyl, carboxyl and halogeno groups. Examples of such monomers have been given above.

The polymers of group α can also consist of polycondensates comprising a plurality of units of the formulae:

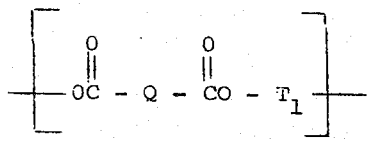   or   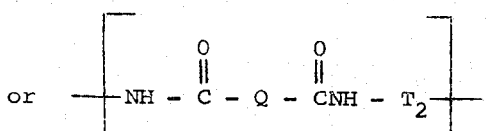

(VIII)   (IX)

in which the symbol Q represents the radical of a diacid of the formula HOOC—Q—COOH, $T_1$ represents the radical of a diol of the formula HO—$T_1$—OH and $T_2$ the radical of a diamine of the formula $H_2N$—$T_2$—$NH_2$, at least one of Q and $T_1$ or $T_2$ containing a tertiary nitrogen atom.

It is to be understood that when the polycondensate contains units of formula (VIII), it can consist of these units alone (i.e. it is a polyester) or it can contain, in addition, urethane or urea groups. In the latter cases, the polymer will consist of a chain made up of a series of units of formula (VIII) connected to other series of units of formula (VIII) by groups of the formula:

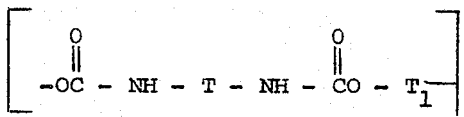 (X)

(T representing a diisocyanate radical of the formula:

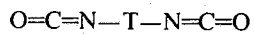

and, where appropriate, by groups of the formula:

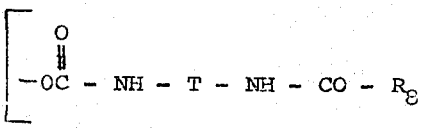 (XI)

$R_8$ representing a valency bond or one of the atoms or groups of the formula;

—O—, —NH—NH—, —HN—$T_2$—NH—,
—O—$T_1$—O— or —NH—NH—CO—NH—.

In general terms, when Q originates from a diacid containing a tertiary nitrogen atom, it represents an alkylene radical containing 2 to 12 carbon atoms, a cycloalkylene radical, particularly with 5 or 6 ring carbon atoms, or an arylene, particularly a phenylene, radical, these various radicals being substituted by a dialkylamino radical the alkyl groups of which preferably have 1 to 4 carbon atoms; a radical consisting of 2 such linear or cyclic radicals joined by an alkylamino group, the alkyl group of which preferably has 1 to 4 carbon atoms; or a heterocyclic structure with 5 or 6 ring members, containing 1 or 2 nitrogen atoms and no other hetero-atom, this atom or one of them being bonded by its three valencies to neighbouring carbon atoms or by two valencies to neighbouring carbon atoms and by the third to a lower alkyl radical (i.e. of 1 to 4 carbon atoms).

The symbols $T_2$ which contain a tertiary nitrogen atom can have any one of the meanings given for Q.

In general terms, when $T_1$ originates from a diol with a tertiary nitrogen atom, it represents an aliphatic hydrocarbon radical containing 2 to 12 carbon atoms, which may be linear or branched, which may be saturated or possess ethylenic or acetylenic unsaturation and which is substituted solely, or at least, by a dialkylamino radical or a radical consisting of 2 of the said aliphatic radicals connected by an alkylimino radical, the alkyl groups of the dialkylamino and alkylimino radicals having 1 to 4 carbon atoms.

Illustrative diacids with a tertiary nitrogen atom which may be used include methylimino-diacetic acid, 3-dimethylamino-hexanedioic acid, 1-dimethylamino-cyclopentane-2,3-dicarboxylic acid, dimethylaminoisophthalic acid, dimethylaminoterephthalic acid, 1-methylpyrimidine-dicarboxylic acid and 1-methyl-imidazole-4,5-dicarboxylic acid.

Illustrative diols with a tertiary nitrogen atom which may be used include alkylamines substituted on the nitrogen atom by two hydroxyalkyl radicals such as ethyl-diethanolamine, or alkylene glycols substituted by a dialkylamino group on a non-hydroxylic carbon atom such as γ-dimethylamino-propylene glycol and γ-diethylamino-propylene glycol.

Illustrative diamines containing a tertiary nitrogen atom which may be used include 3-dimethylamino-hexane-1,6-diamine, 3-N-methylpiperazino-hexane-1,6-diamine, 3-pyrrolidino-hexane-1,6-diamine, 3-piperidino-hexane-1,6-diamine, 3-morpholino-hexane-1,6-diamine, N-bis-(3-amino-propyl)-methylamine, N-bis-(3-amino-propyl)-cyclohexylamine and N-bis-(3-amino-propyl)-aniline.

Any diacid, diol and diamine usually employed in the preparation of polyesters and polyamides can be used as diacids, diols and diamines which do not contain any tertiary nitrogen atoms and which can take part in the preparation of the polycondensates of formula (VIII) and (IX).

Examples of diacids include aliphatic diacids such as succinic, glutaric, adipic, pimelic, suberic, azelaic, sebacic, maleic and fumaric acids; cycloalkane-dicarboxylic acids such as cyclohexane-1,4-dicarboxylic acid; and aromatic acids such as benzene-dicarboxylic acids.

Examples of diols include 1,2-ethanediol, 1,2- and 1,3-propanediols, 1,2-, 1,3- and 1,4-butanediols, 1,5-pentanediol, 1,6-hexanediol, 1,10-decanediol, 2,2-dimethyl-1,3-propanediol and 1,2-diethyl-1,3-propanediol.

As examples of diamines, there may be mentioned ethylene-diamine, 1,2-diamino-propane, 2,2-bis-(4-amino-cyclohexyl)-propane, 1,6-diamino-hexane, meta-phenylenediamine, 2,3-, 2,7- and 3,6-diamino-carbazoles and N,N'-bis-(carbonamidopropyl)-hexane-1,6-diamine.

As examples of diisocyanates of the formula O×N—T—N×C—O which can be used for preparing polycondensates of the polyurethane type, there may be mentioned 1,6-diisocyanato-hexane, 2,4-diisocyanato-toluene, 2,6-diisocyanato-toluene, meta-diisocyanato-benzene, 2,2-bis-(4-isocyanato-cyclohexyl)-propane, bis-(4-isocyanato-cyclohexyl)-methane, 1,5-diisocyanato-pentane, 1,4-diisocyanato-cyclohexane and bis-(4-isocyanato-phenyl)-methane.

As examples of compounds which can be used together with the abovementioned isocyanates in order to obtain groups:

—O—CO—NH—T—NH—CO—R$_8$—CO—NH—T—NH—CO—O—T$_1$— there may be mentioned water, hydrazine and aminoacetyl hydrazide as well as the primary diols and diamines, with or without a tertiary nitrogen atom, mentioned above.

The abovementioned polycondensates generally possess a hydrophobic character which makes it possible to omit crosslinking. It is however possible to carry out such crosslinking either at the level of the tertiary nitrogen atoms or at the level of other reactive groups such as, for example, the ethylenic double bonds which can be present in the diacids and which can react with polyunsaturated compounds in the presence of free radical generators or under the effect of irradiation.

It is apparent from what has been stated above that the tertiary amine groups of the polymers of group $\alpha$ can be quaternised by means of mono- or polyquaternising compounds. The polyquaternising compounds used are mainly polyhalogenated derivatives of alkanes, cycloalkanes and arylalkanes, and especially alkylene, cycloalkylene or arylalkylene dihalides, and polyhalogenated polymers, the halogen atoms of these compounds being carried by carbon atoms which are not adjacent to one another. As examples of such polyquaternising agents, there may be mentioned 1,3-dichloro-propane, 1,3-dibromo-propane, 1,4-dichlorobutane, 1,4-dibromo-butane, 1,4-diiodo-butane, 1,4-dichloro-2-butene, bis-(chloromethyl)-benzenes, bis-(chloromethyl)-toluenes, bis-(chloromethyl)-xylenes, 1,3-bis-(chloromethyl)-1,1,3,3-tetramethyl-disiloxane, polyepichlorohydrin and $\alpha$-chlorinated polyethers such as chlorinated polyethylene glycol.

As monoquaternising agents, the esters which are usually employed to form quaternary ammonium compounds with tertiary amines, and particularly alkyl and aralkyl halides and sulphates, can be used. More specifically, methyl, ethyl, propyl, cyclohexyl and benzyl chlorides, bromides and iodides, and dimethyl and diethyl sulphates may be mentioned. It is also possible to use halogenated derivatives which contain other chemical functional groups such as chloroacetaldehyde.

The substituents of the polymers of group $\beta$ which are capable of reacting with a tertiary amine to give quaternary ammonium groups are generally halogen atoms. The polymers of group $\beta$ can thus be defined as comprising a plurality of units of the formula:

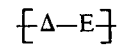

(XII)

in which the symbol represents an organic radical carrying a halogen substituent and the symbol E, which can differ from one unit to another, represents a divalent group which can be chosen from the group consisting of —O—, —SO$_2$— and —(CH$_2$)$_v$—, $v$ being between 1 and 4.

It is to be understood that the polymers of group $\beta$ can contain units which are free from halogenated groups in conjunction with the units of formula (XII).

The polymers of group $\beta$ can be obtained by polymerisation of monomers containing halogenated groups. Examples of this type consist of the homopolymers and copolymers of 2-chloroethyl methacrylate.

More generally, the halogenated polymers $\beta$ can be obtained by attaching halogenated groups to macromolecular chains which are free from such groups. The techniques for attaching halogenated groups to polymers are described in the literature. Amongst those used most frequently, there may be mentioned the halomethylation, particularly chloromethylation, of polymers containing aromatic groups and the treatment with epihalohydrins, particularly epichlorohydrin, of polymers containing hydroxylic groups. As examples of polymers containing aromatic groups, there may be mentioned polymers containing units of the formula:

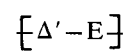

(XIII)

in which the symbol ' represents a p-phenylene radical, which may optionally be substituted by one or two alkyl radicals with 1 to 4 carbon atoms or one or two phenyl radicals, or a radical of the formula:

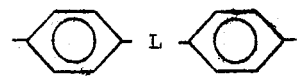

in which the symbol L represents an alkylene or alkenylene radical with at most 12 carbon atoms or a —CO— group, E being as defined above.

Particular examples of hydroxylic polymers are poly(hydroxyethers) consisting of a plurality of units of the formula:

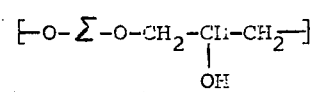

(XIV)

in which the symbol $\Sigma$ represents a divalent radical which can be chosen from the group consisting of the radicals of the formula:

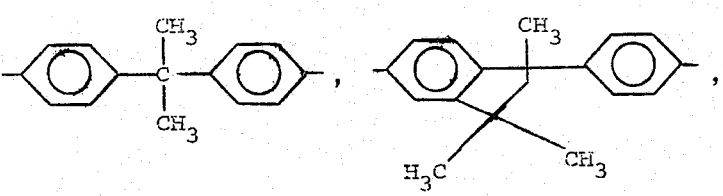

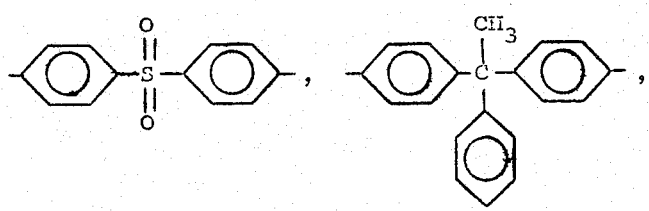

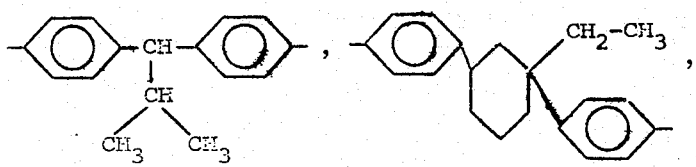

and 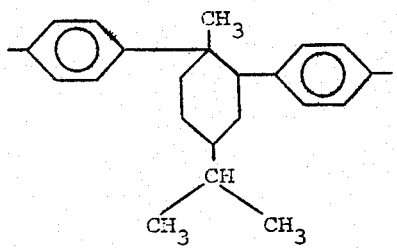

Amongst the tertiary amines which can react with the halogenated polymers described above, there may be mentioned trialkylamines with alkyl radicals which are unsubstituted or substituted by a functional group, the alkyl radicals preferably having 1 to 4 carbon atoms. Such tertiary amines can be illustrated by trimethylamine, triethylamine, tripropylamine, N-dialkylalkanolamines, N-alkyldialkanolamines, and trialkanolamines such as dimethylethanolamine and triethanolamine. Heterocyclic amines such as pyridine, picolines, lutidines, N-alkylpiperidines, N,N'-dialkylpiperazines; quinoxaline, N-alkylmorpholines, melamine and melamine derivatives which are disubstituted on the extranuclear nitrogen atoms such as hexamethylolmelamine and hexamethoxymethylmelamine; and aromatic amines such as N,N'-dimethylaniline can also be used.

It is thus apparent that it is possible to use either compounds which contain only one tertiary amine group or compounds which contain several of these groups. In the latter case, it is possible simultaneously to form $N^{(+)}$ groups in the polymer and to crosslink it.

The amount of mono- or poly-quaternising agents to be used can generally represent from 20 to 1,000 percent of the theoretical amount for quaternising all of the tertiary amine groups. Likewise, the amount of tertiary mono- or poly-amine for quaternising a polymer β can generally represent 20 to 1,000 percent of the theoretical amount for quaternising all the amine groups on this polymer.

When the polymer is crosslinkable by groups other than nitrogen-containing groups, the amount of crosslinking agent is generally such that more than 10 percent, and preferably 50 to 100 percent, of the reactive groups are crosslinked.

It is thus possible to carry out more or less extensive crosslinkings, either of a single type, or by combining various different types. One skilled in the art will appreciate that the appropriate method and degree of crosslinking can be determined easily by simple experimentation.

In the microcapsules according to this invention, the core consisting essentially of the sulphonic acid resin has a diameter which is preferably between 100 and 2,000μ and the thickness of the skin formed by the ammonium polymer is preferably between 1 and 50μ.

The present invention also provides a process for the manufacture of the microcapsules by, for example, producing microspheres of sulphonic acid resin for example, by suspension polymerisation, and coating these by depositing a solution (S) as defined below, and then removing the solvent. In particular:

a. The solution (S) can be a solution of a non-crosslinked cationic polymer in an organic solvent, which can be used directly.

b. The solution (S) can also consist of a cationic polymer possessing groups which make crosslinking possible, and a cross-linking reagent.

c. The solution (S) can also contain a non-quaternised or partially quaternised but not crosslinked polymer α or β, which can, in addition, optionally carry reactive groups which make non-quaternising crosslinking possible with a polyfunctional reagent, and a polyfunctional reagent ensuring crosslinking quaternisation, optionally combined with a polyfunctional reagent ensuring non-quaternising crosslinking.

With solutions of types (b) and (c), the removal of the solvent is accompanied by crosslinking.

The choice of the solvent naturally depends on the nature of the polymer. In general terms, however, the various polymers mentioned above are soluble in aprotic polar solvents such as dimethylformamide (DMF), dimethylacetamide (DMAC), dimethylsulphoxide (DMSO), hexamethylphosphotriamide (HMPT), 2-N-methylpyrrolidone (NMP), sulpholane and ethylene carbonate. It is of course possible to use mixtures of these solvents with one another and/or with other organic solvents such as ketones and esters.

Various methods can be used to coat the particles of sulphonic acid resin and to form the skin. The preferred method for carrying out the process is fluidisation. According to this process, a fluidised bed of sulphonic acid resin particles, kept in suspension by means of a stream of air or an inert gas is formed, and the solution (S) is sprayed, for example by means of a jet of compressed gas, in fine droplets which are deposited on the grains of sulphonic acid resin. The viscosity of the solution (S) should, in general terms, be between 1 cp and 100 poises, in order to achieve an appropriate coating of this solution. The concentration of the latter naturally depends on the nature of the polymer used. In general terms, it should be between 0.1 and 40 percent (in grams of dry polymer per gram of solution).

The rate of flow of the gas used for the fluidisation of the sulphonic acid resin particles is generally between 0.25 and 75 l./min.cm$^2$, the temperature of this gas is generally between 20 and 150°C. and the rate of flow of the solution (S) is between $2 \times 10^{-3}$ and 0.5 cm$^3$/min.cm$^2$ (of surface area of the fluidised bed).

The vaporisation of the solution (S) is preferentially preceded by vaporisation of the solvent alone for 1 to 20 minutes. It is also advantageous to carry out the coating in several stages, for example in 2 to 5 stages, the deposition of each layer of solution being followed by drying the microcapsules, for example for 1 to 20 minutes at a temperature of between 20° and 150°C.

DESCRIPTION OF THE DRAWING

The process described above can be carried out in an apparatus such as that shown schematically in the accompanying FIGURE, which is included merely by way of illustration. This apparatus comprises essentially:

a. a device for fluidisation of the sulphonic acid resin particles and b. a device for spraying the solution of polymer (S).

The fluidisation device consists essentially of a cylindrical chamber 4 divided horizontally into two parts by a layer of porous material 14. The upper part of the chamber contains, firstly, sulphonic acid resin grains 17 and, secondly, the nozzle of a vaporiser 5. The lower part of the chamber is closed and a pipeline 16 for supplying the gas used in the fluidisation (carrier gas A) opens into this part. A valve 10, a device for measuring the rate of flow of gas 11, a manometer 12 and a device for heating the gas 13 are situated in this pipeline.

The device for spraying the polymer solution comprises a container 1 adapted to receive solution 2 and a pipeline 6 provided with a flow meter 3 which opens into the lower part of the nozzle of the spraying device or vaporiser 5. The gas used for the spraying (carrier gas B) is conveyed to the spraying device 5 by a pipeline in which control [valve 9] and measuring [manometer 8 and flow meter 7] devices are included.

It is to be understood that, although a process for the manufacture of the microcapsules which makes use of the fluidisation technique has been described in some detail, any other microencapsulation process can be used.

The microcapsules of the present invention can be used, in particular, for removing urea contained in a dialysis bath (artificial dialysis kidney machine) or in an ultrafiltrate (artificial ultrafiltration kidney machine). These microcapsules possess a high urea/salt selectivity, that is to say that they retain urea whilst being rather impermeable to salt. This property is advantageous since the use of such microcapsules does not substantially alter the electrolyte composition of the dialysis bath or of the ultrafiltrate. Because of this, it is generally not necessary to re-equilibrate the dialysis bath or the ultrafiltrate with respect to ionic species after removal of urea by means of the microcapsules of this invention.

DESCRIPTION OF THE PREFERRED EMBODIMENTS

The following Examples further illustrate the present invention.

EXAMPLE 1

A. Preparation of the polymers 1,700 cm$^3$ of dimethylsulphoxide and 1.87 g. of stannous oxalate are introduced into a 3 litre reactor. The mixture is stirred for one hour at ambient temperature in order to obtain a solution which is then heated to 65°C. 531 g. of acrylonitrile, 94 9. of dimethylaminoethyl methacrylate and 5.63 g. of azo-bis-isobutyronitrile are added. Heating and stirring are continued for 4 hours. 3,750 cm$^3$ of dimethylformamide are added, followed by 12 litres of water, added gradually over the course of one hour. After washing and drying, 423 g. of a copolymer are obtained which contains 19 percent by weight of dimethylaminoethyl methacrylate radicals. This copolymer has a specific viscosity of 0.182 (measured at 25°C. on a 2 9./1. solution in dimethylformamide).

The sulphonic acid resin is a sulphonated styrene/-divinylbenzene copolymer (85/15 weight ratio), used in the acid form (-SO$_3$H); it has a theoretical exchange capacity of 4 meq/g. of resin.

B. Preparation of the microcapsules

The sulphonic acid resin is in the form of grains from which, after sieving, particles of average diameter between 0.4 and 1 mm. are collected.

The apparatus used is that illustrated in the accompanying FIGURE.

A solution (S$_1$) of an acrylonitrile/dimethylaminoethyl methacrylate copolymer in DMF, the said solution containing 2.5 percent by weight of copolymer and 0.41 percent by weight of bis-chloromethyl-p-xylene, is introduced into the container 1.

At the start of the experiment, the grains of sulphonic acid resin are placed on the support 14 which is a sintered stainless steel plate of thickness 4 mm. and porosity 25μ. The diameter of this plate is 9 cm.

The grains of sulphonic acid resin are suspended by a stream of compressed air (carrier gas A), heated to a temperature of 75°C. The rate of flow of this gas is 180 l./min.

The solution 2, delivered at the rate of 2.1 cm³/min, is sprayed onto the resin grains under the effect of a stream of compressed air (carrier gas B), delivered at the rate of 10 l./min. This gas is at ambient temperature (23°C.).

200 cm³ of the solution 2 are sprayed onto 120 g. of sulphonic acid resin grains in this way and then the microcapsules are washed by spraying with 20 cm³ of DMF and dried for 10 minutes at 75°C. Four spraying-/washing/drying cycles are carried out.

In the microcapsules thus produced, the core has a diameter of between 0.4 and 1 mm. (as stated above) and the skin, consisting of the quaternised and crosslinked acrylonitrile/dimethylaminoethyl methacrylate copolymer, has an average thickness of between 15 and 25µ. (The permeation selectivity of a membrane of thickness 30µ prepared by casting the solution $S_1$ followed by drying for 15 hours at 40°C. is 84 percent; the water absorption of this membrane is 15 percent).

C. The properties of the microcapsules with respect to urea and sodium chloride are determined by carrying out the following test:

10 g. of microcapsules are immersed in 100 cm³ of an aqueous solution of urea at a concentration of 1 g./l.

The variation in the concentration of urea in the solution is followed by removing samples at regular intervals and carrying out spectrophotometric determinations.

From the formula:

$$K = \frac{2.3 \, r \, V}{3 \, v \, \Delta t} \log \frac{C_t}{C_{t+\Delta t}}$$

in which
$\Delta t$ denotes the time interval between the removal of two samples carried out at times $t$ and $t+\Delta t$,
$C_t$ denotes the concentration of the solution at time $t$,
$C_{t+\Delta t}$ denotes the concentration of the solution at time $t+\Delta t$,
$r$ denotes the average diameter of the microcapsules,
$v$ denotes the volume of 10 g. of microcapsules,
and V denotes the volume of the urea solution,
the permeability of the microcapsules to urea ($K_{urea}$) (or the speed at which a molecule of urea passes into the microcapsule) is deduced.

The following result is obtained:

$$K_{urea} = 2.82 \times 10^{-2} \text{ dm/hour.}$$

The operation is repeated with an aqueous solution of 8 g. of NaCl/l and the change in the quantity of Na⁺ ions which passes into the microcapsules is followed by measuring the pH.

The permeability of the microcapsules to NaCl is thus determined. The following result is obtained:

$$K_{salt} = 2.53 \times 10^{-4} \text{ dm/hour.}$$

The selectivity $K_{urea}/K_{salt}$ of the microcapsules is thus 111.

These determinations show the high selectivity of the microcapsules according to the invention with respect to urea and salt.

D. 15 g of microcapsules produced according to B are stirred to 50 cm³ of a solution containing 8.06 g of NaCl/l for 20 minutes and are then washed with 5 times 100 cm³ of distilled water. These microcapsules are then introduced into a column of diameter 11.2 mm where they occupy a volume of 38.5 cm³. An aqueous solution containing 1 g of urea and 8.06 g of NaCl/l is passed through the column at the rate of 40 cm³/hour. The concentration of each of these compounds in the solution is followed by removing samples at the outlet of the column.

After 8 hours, the amount of urea retained is about 21 g per kilogram of microcapsules and the amount of salt retained is 7.5 g.

EXAMPLE 2

A. In accordance with the technique described under A in Example 1, an acrylonitrile/2-vinyl-5-methylpyridine copolymer is prepared from the following amounts of reagents:

| | |
|---|---|
| Dimethylsulphoxide | 1,700 cm³ |
| Acrylonitrile | 500 g |
| 2-Vinyl-5-methyl-pyridine | 125 g |
| Stannous oxalate | 1.87 g |
| Azo-bis-isobutyronitrile | 5.63 g |

435 g of a copolymer are obtained which possesses a specific viscosity of 0.314 (0.2 percent solution in DMF at 25°C). This copolymer contains 74 percent by weight of polymerised acrylonitrile and 26 percent of 2-vinyl-5-methyl-pyridine.

(The permeation selectivity of a membrane of thickness 30µ, prepared by casting the solution $S_2$ (see below) followed by drying at 60°C for 15 hours is 80 percent and its water absorption is 18 percent.)

The sulphonic acid resin used is that of Example 1.

B. Microcapsules are prepared under the conditions described in Example 1 as far as the nature and the amount of sulphonic acid resin, the temperature and the flow rate of the carrier gases A and B are concerned. The solution ($S_2$) for coating the sulphonic acid resin grains is a solution, in DMF, which contains 2.5 percent by weight of the polymer obtained under A and 2.75 percent of bis-chloromethyl-p-xylene. The rate of flow of this solution is 1.6 cm³/min. Three sprayings followed by washing and drying are carried out as in Example 1.

The microcapsules obtained have a skin of average thickness between 20 and 30µ.

C. The permeability of these microcapsules to urea and to NaCl are measured as in Example 1 C.

The following result is obtained:

$$K_{urea} = 6.4 \times 10^{-2} \text{ dm/hour}$$

$$K_{salt} = 3.3 \times 10^{-3} \text{ dm/hour}$$

which gives a selectivity urea/salt of about 20.

EXAMPLE 3

A. The following are introduced into a 25 litre reactor: 12.5 litres of chloroform and 2,500 g of an epichlorohydrin/bis-phenol A polycondensate with a molecular weight of 25,000.

The mixture is heated under reflux, with stirring, for 5 hours and then 978 g of epichlorohydrin are introduced followed by 2.5 litres of a 1 percent by volume solution of an ethyl ether/BF₃ complex, added over the course of 30 minutes.

Stirring and heating under reflux are continued for 1 hour 30 minutes. After cooling the solution is added to 60 litres of isopropanol to precipitate the polymer. The precipitate is dried in vacuo (pressure 100 mm of mercury) at 50°C after washing twice with 10 litres of methanol.

The polymer is ground, washed twice with 20 litres of methanol and then filtered off and dried for 20 hours in vacuo (100 mm of mercury) at 50°C.

2,920 g of a polymer containing 8.24 percent by weight of chlorine are collected.

1,340 g of this polymer are dissolved in 10.5 litres of DMF at 60°C. After 5 hours, the solution is cooled to ambient temperature and then the solution obtained, and 2,680 g of trimethylamine, are introduced into an autoclave. The autoclave is closed and heated to 70°C with shaking, for 40 hours.

The excess trimethylamine is removed and the solution obtained is concentrated in vacuo (10 mm of mercury) at 70°C until a solids content of 30 percent is obtained. The percentage by weight of nitrogen in the solid material is 2 percent.

The sulphonic acid resin used is that of Example 1.

B. Microcapsules are manufactured under the conditions described in Example 1, except for the following conditions:

Rate of flow of the carrier gas A: 150 1/min, and temperature of the carrier gas A: 100°C Composition of the coating solution:
330 g of the solution containing 30 percent of solid material obtained under A,
15 g of hexamethoxymethylmelamine and
1.15 g of a 20 percent solution of p-toluenesulphonic acid and sufficient DMF to bring the volume of the solution ($S_3$) to 4 litres.

Four coatings are carried out in accordance with the technique of Example 1.

The microcapsules possess a skin, the average thickness of which is between 15 and 25$\mu$.

The polymer forming the skin of the microcapsules, which originate from the solution ($S_3$), possesses, in the form of a membrane of thickness 30$\mu$ which has been dried at 60°C for 15 hours, a permeation selectivity of 85 percent and a water absorption of 20 percent.

C. The permeability of these microcapsules to urea and to NaCl is measured as in Example 1 C.

The following result is obtained:

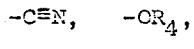

$K_{urea} = 9.15 \times 10^{-2}$ dm/hour $K_{salt} = 4.5 \times 10^{-3}$ dm/hour, which gives a selectivity urea/salt of about 20.

We claim:

1. Substantially spherical microcapsules of diameter between about 10$\mu$ and 5 mm, consisting essentially of a crosslinked polymer containing sulphonic acid groups and possessing a theoretical exchange capacity greater than about 0.5 meq/g of dry polymer having a skin coating of a coating polymer containing quaternary ammonium groups bonded by at least one covalent bond to the chain of said coating polymer, the polymer possessing a permeation selectivity greater than about 65 percent and a water absorption of between about 2 and 50 percent, the thickness of the skin being about 0.1 to 20 percent of the radius of the microcapsule.

2. Microcapsules according to claim 1 in which the polymer containing sulphonic acid groups consists essentially of:

a. 50 to 90 percent by weight of units of the formula:

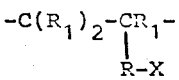

(I)

b. 2 to 50 percent by weight of units of the formula:

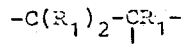
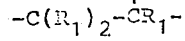

(II)

and c. 0 to 30 percent by weight of units of the formula:

$$-CR_2R_3-C(R_3)_2-$$

(III)

in which:
each of the $R_1$ radicals, which may be identical or different, represents a hydrogen atom or an alkyl radical containing 1 to 4 carbon atoms; R represents:
either a valency bond
or a linear or branched, unsubstituted or substituted by one or more halogen atoms or OH groups, alkylene or alkenylene radical containing at most 6 carbon atoms, a phenylene radical or a divalent radical consisting of either alkylene radicals linked by —O— or —S— atoms or of at least one alkylene radical and at least one phenylene radical linked together either directly or via —O— or —S— atoms, the total number of carbon atoms in the alkylene groups of said divalent radicals being at most equal to 18, said divalent radicals containing at most 3 phenylene radicals;
or a —O—R'— or —S—R'— group, R' representing a divalent radical as defined above under R; each of the $R_2$ radicals, which may be identical or different, represents a hydrogen atom, a halogen atom or an alkyl radical containing 1 to 4 carbon atoms; each of the $R_3$ radicals, which may be identical or different being as defined under $R_2$ or represents a radical of the formula:

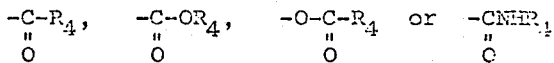

in which $R_4$ represents a hydrogen atom or a linear or branched alkyl radical containing up to 30 carbon atoms, a cycloalkyl radical containing 5 or 6 carbon atoms in the ring or an aryl, alkoxyaryl or aralkoxy radical, the symbol 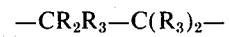 represents a divalent atom or group, which is —O—, —S—, —NH—, —SO$_2$— or a divalent organic radical which may optionally contain a —SO$_3$H substituent and X, which can vary from unit to unit, represents a —SO$_3$H group or a hydrogen atom.

3. Microcapsules according to claim 2 in which the divalent radicals which R' may represent contain at most 6 halogen atoms and at most 6 OH groups.

4. Microcapsules according to claim 2 in which $R_4$ represents an alkoxyaryl or aralkoxy radical, the aryl radical being phenyl and the alkoxy radical containing at most 6 carbon atoms.

5. Microcapsules according to claim 2 in which the symbol . represents an alkylene or alkenylene radical with at most 6 carbon atoms, or said radical containing at least one chain —O—, —S—, —NH—, —SO$_2$— or —C$_6$H$_4$— group, or a simple phenylene radical, or said radicals optionally being substituted by —SO$_3$H.

6. Microcapsules according to claim 1 in which the sulphonated polymer is a sulphonated styrene/divinyl benzene copolymer.

7. Microcapsules according to claim 1 in which the polymer forming the skin is the reaction product of:
  a. a polymer comprising a plurality of units of the formula:

either alone or with up to 90% of units of formula (III):

$$-CR_2R_3-C(R_3)_2-$$

in which:
each of the $R_1$ radicals, which may be identical or different, represents a hydrogen atom or an alkyl radical containing 1 to 4 carbon atoms; each of the $R_2$ radicals, which may be identical or different, represents a hydrogen atom, a halogen atom or an alkyl radical containing 1 to 4 carbon atoms; each of the $R_3$ radicals, which may be identical or different being as defined under $R_2$ or represents a radical of the formula:

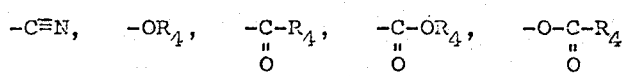

in which $R_4$ represents a hydrogen atom or a linear or branched alkyl radical containing up to 30 carbon atoms, a cycloalkyl radical containing 5 or 6 carbon atoms in the ring or an aryl, alkoxyaryl or aralkoxy radical, the symbol 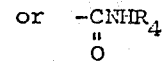 represents a divalent atom or group, which is $-O-$, $-S-$, $-NH-$, $-SO_2-$ or a divalent organic radical which may optionally contain a $-SO_3H$ substituent and X, which can vary from unit to unit, represents a $-SO_3H$ group or a hydrogen atom and $R_5$ representing:
  i. a group of the formula:

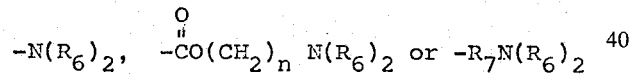

$n$ being an integer from 1 to 4, each of the $R_6$ radicals, which may be identical or different, representing an alkyl radical with 1 to 6 carbon atoms and $-R_7-$ representing a linear or branched alkylene radical with up to 12 carbon atoms or a cycloalkylene radical with 5 or 6 ring carbon atoms, or a phenylene radical,
  or (ii) a heterocyclic radical with 5 or 6 ring members, containing one or two nitrogen atoms but no other hetero atom, optionally fused to one or two benzene rings, the atom or at least one of the nitrogen atoms of the heterocyclic radical being bonded by its three valencies to adjacent carbon atoms in the heterocyclic ring or being bonded by two valencies to said carbon atoms by the third to a group $R_6$, as defined above, with (b) a monoquaternising or polyquaternising compound of mixtures thereof.

8. Microcapsules according to claim 7 in which the polymer forming the skin comprises 15 to 40 percent of units of formula (VII) and 85 to 60 percent of units of formula (III).

9. Microcapsules according to claim 7 in which the polymer forming the skin is the reaction product of a polymer containing a plurality of units of formula (VII) and units of formula (III), at least a part of the units of formula (III) carrying reactive groups other than tertiary amino groups, with a monoquaternising or a polyquaternising compound or mixtures thereof, and with a polyfunctional agent which reacts with the reactive groups of the units of formula (III).

10. Microcapsules according to claim 1 in which the polymer forming the skin is the reaction product of:
  a. a polycondensate comprising a plurality of units of the formula:

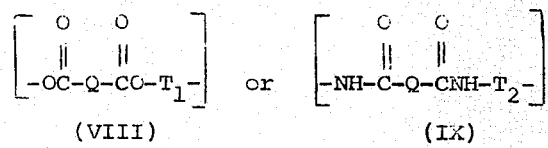

in which Q represents the radical of a diacid of the formula $HOOC-Q-COOH$, $T_1$ represents the radical of a diol of the formula $HO-T_1-OH$ and $T_2$ represents the radical of a diamine of the formula $H_2N-T_2-NH_2$, at least one of the radicals represented by the symbols Q and $T_1$ or $T_2$ containing a tertiary nitrogen atom, with
  b. a mono- or poly quaternising agent.

11. Microcapsules according to claim 10 in which the units possessing tertiary nitrogen atoms are as follow: in the case of Q and $T_2$: an alkylene radical containing 2 to 12 carbon atoms, a cycloalkylene radical with five or six ring carbon atoms, or an arylene radical, substituted by a dialkylamino radical; a radical consisting of 2 of said alkylene or arylene radicals joined by an alkylimino group; or a heterocyclic structure with 5 or 6 ring members, containing 1 or 2 nitrogen atoms and no other heteroatom, said nitrogen atom or one of said atoms being bonded by its three valencies to adjacent carbon atoms or by two valencies to adjacent carbon atoms and by the third to an alkyl radical of 1 to 4 carbon atoms, in the case of $T_1$: a linear or branched aliphatic hydrocarbon radical containing 2 to 12 carbon atoms, which may be saturated or possess ethylenic or acetylenic unsaturation and which is substituted solely, or at least, by a dialkylamino radical, or a radical consisting of 2 of said aliphatic radicals connected by an alkylimino radical, the alkyl groups of the dialkylamino and alkylimino radicals having 1 to 4 carbon atoms.

12. Microcapsules according to claim 11 in which Q or $T_2$ or both represents a cycloalkylene radical with 5 or 6 ring carbon atoms or a phenylene radical, substituted by a dialkylamino radical of 1 to 4 carbon atoms.

13. Microcapsules according to claim 10 in which the skin is the reaction product of a polycondensate comprising a plurality of units of formulae (VIII) or (IX) of which some possess bonds of an olefinic nature, with, firstly, a monoquaternising or a polyquaternising compound or mixtures thereof and, secondly, with a polyunsaturated compound which is capable of reacting with the ethylenic double bonds present in the polycondensate.

14. Microcapsules according to claim 10 in which the polycondensate is a polycondensate containing blocks of units of formula (VIII) connected by groups of the formula:

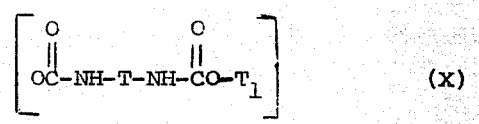

T representing the diisocyanate radical of the formula:

$$O=C=N-T-N-C=O$$

or by groups of the formula:

$$\left[-OC-NH-T-NH-CO-R_8-CO-NH-T-NH-\overset{O}{\overset{\|}{C}}O-T_1-\right]$$ (XI)

$R_8$ representing a valency bond or an atom or group of the formula: —O—, NH—NH—, —HN—$T_2$—NH—, —O—$T_1$O— or —NH—NH—CO—NH—.

15. Microcapsules according to claim 1, in which the polymer forming the skin is the reaction product of a polymer comprising a plurality of units of the formula:

a.

$$-\Delta-E-$$ (XII)

in which Δ represents an organic radical carrying a halogen substituent and each of the E radicals, which may be identical or different, represents —O—, —$SO_2$— or —$(CH_2)_v$— group, $v$ being from 1 to 4, or units which do not carry halogen atoms, with b. a tertiary monoamine or a compound carrying several tertiary amino groups.

16. Microcapsules according to claim 15, in which the polymer of formula (XII) is the reaction product of a chloromethylating agent with a polymer of the formula:

$$-\Delta'-E-$$ (XIII)

in which Δ' represents a p-phenylene radical, which may optionally be substituted by one or two alkyl radicals with 1 to 4 carbon atoms or by one or two phenyl radicals or a radical of the formula:

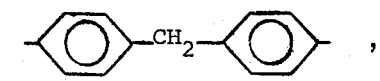

in which L represents an alkylene or alkenylene radical with at most 12 carbon atoms or a —CO— group.

17. Microcapsules according to claim 15 in which the polymer of formula (XII) is the reaction product of an epihalohydrin with a hydroxylic polymer consisting of a plurality of units of the formula:

$$\left[-O-\Sigma-O-CH_2-\underset{OH}{CH}-CH_2-\right]$$ (XIV)

in which the symbol Σ represents a divalent radical of the formula:

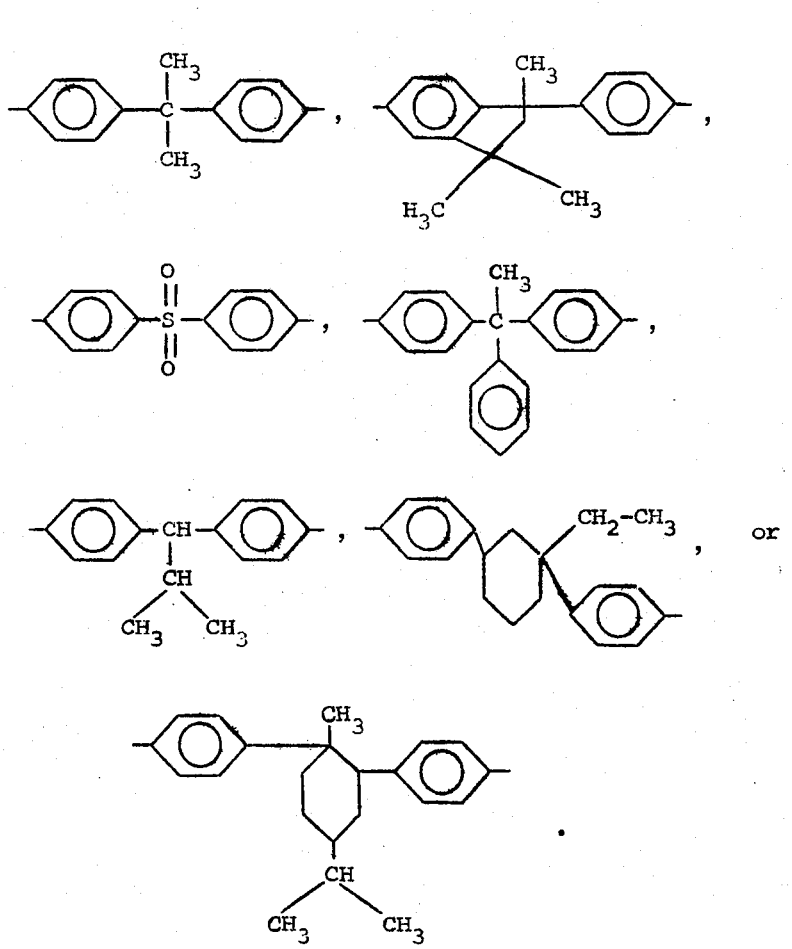

18. Microcapsules according to claim 1 in which the polymer forming the skin is derived from a dimethylaminoethyl methacrylate/acrylonitrile, 2-vinyl-5-methylpyridine/acrylonitrile or epichlorohydrin/bisphenol A copolymer.

* * * * *